(12) United States Patent
Hashimoto et al.

(10) Patent No.: US 11,279,231 B2
(45) Date of Patent: Mar. 22, 2022

(54) COOLING DEVICE FOR VEHICLE (71) Applicant: Toyota Jidosha Kabushiki Kaisha, Toyota (JP)

(72) Inventors: Susumu Hashimoto, Ebina (JP); Shunsuke Fushiki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 332 days.

(21) Appl. No.: 16/564,301

(22) Filed: Sep. 9, 2019

(65) Prior Publication Data
US 2020/0130507 A1 Apr. 30, 2020

(30) Foreign Application Priority Data

Oct. 26, 2018 (JP) .............................. JP2018-201794

(51) Int. Cl.
B60K 11/02 (2006.01)
F16H 57/04 (2010.01)
F01P 3/20 (2006.01)
F01P 5/12 (2006.01)
B60K 25/00 (2006.01)
B60K 6/24 (2007.10)
B60L 1/00 (2006.01)
B60K 6/26 (2007.10)
F01P 3/18 (2006.01)
(Continued)

(52) U.S. Cl.
CPC ................ B60K 25/00 (2013.01); B60K 6/24 (2013.01); B60K 6/26 (2013.01); B60K 11/02 (2013.01); B60L 1/003 (2013.01); F01P 3/18 (2013.01); F01P 5/12 (2013.01); F01P 7/14 (2013.01); H02K 7/006 (2013.01); B60K 2025/005 (2013.01); B60Y 2200/92 (2013.01); B60Y 2306/05 (2013.01); F01P 2050/24 (2013.01)

(58) Field of Classification Search
CPC .. B60K 11/02; B60K 17/02; B60K 2001/003; F16H 57/0441; F16H 61/0031; F01P 3/20; F01P 2005/105; F01P 2005/125; F01P 2050/24; F01P 5/12; F01P 7/14; F01P 7/164
See application file for complete search history.

(56) References Cited

U.S. PATENT DOCUMENTS 8,869,756 B2 * 10/2014 Bilezikjian ............... F01P 3/02
123/41.02
2005/0188927 A1 9/2005 Kaya et al.
(Continued)

FOREIGN PATENT DOCUMENTS

JP 2008-155719 A 7/2008
JP 2010180713 A 8/2010

Primary Examiner — Long T Tran
(74) Attorney, Agent, or Firm — Dinsmore & Shohl LLP (57) ABSTRACT A cooling device for vehicle includes: an electric motor; an engine cooling pump; a power-control unit cooling pump; and a differential mechanism. The engine cooling pump is configured to allow an engine cooling water to flow by rotary power of the electric motor. The power-control unit cooling pump is configured to allow a cooling liquid for power control unit to flow by the rotary power of the electric motor. The differential mechanism makes a flowrate of the engine cooling pump different from a flowrate of the power-control unit cooling pump by controlling transmission of the rotary power from the electric motor.

7 Claims, 10 Drawing Sheets (51) Int. Cl.
  *F01P 7/14* (2006.01)
  *H02K 7/00* (2006.01)

(56) References Cited

U.S. PATENT DOCUMENTS

| | | | |
|---|---|---|---|
| 2015/0032314 A1* | 1/2015 | Kitamura | E02F 9/2091 |
| | | | 701/22 |
| 2015/0051768 A1* | 2/2015 | Miyamoto | B60W 30/1843 |
| | | | 701/22 |
| 2016/0134214 A1* | 5/2016 | Nakao | H02P 6/18 |
| | | | 318/400.32 |

* cited by examiner

COOLING DEVICE FOR VEHICLE

CROSS-REFERENCE TO RELATED APPLICATION

This application claims priority to Japanese Patent Application No. 2018-201794 filed on Oct. 26, 2018, the entire contents of which are herein incorporated by reference.

FIELD

The present application relates to a cooling device for vehicle.

BACKGROUND

As described in JP2010-180713A, for example, a hybrid vehicle including an electric water pump for circulating a cooling water has been known.

A hybrid vehicle includes an internal combustion engine, a running motor, and a power control unit for controlling this running motor. The internal combustion engine is cooled by an engine cooling water made, to flow by a pump for cooling the engine. The power control unit is cooled by another cooling fluid different from the engine cooling water made to flow by a pump for cooling the power control unit.

An, electric pump includes components such as an electric motor and a driver. The pump for cooling the engine and the pump for cooling the power control unit have been individual electric pumps in general. If the number of the electric pumps increases, the number of components such as the electric motors and the drivers also increases in proportion to the number of electric pumps. As a result, there is a problem of high costs.

SUMMARY

The present application is intended to solve the problem as above and has an object to provide a cooling device for vehicle improved so as to suppress costs.

A first cooling device for vehicle according to the present application includes; an electric motor; an engine cooling pump; a power-control unit cooling pump; and a differential mechanism. The engine cooling pump is configured to allow an engine cooling water to flow by rotary power of the electric motor. The power-control unit cooling pump is configured to allow a cooling liquid for power control unit to flow by the rotary power of the electric motor. The differential mechanism makes a flowrate of the engine cooling pump different from a flowrate of the power-control unit cooling pump by controlling transmission of the rotary power from the electric motor.

The first cooling device for vehicle may further include an oil pump configured to allow an oil for transaxle to flow by the rotary power of the electric motor.

In the first cooling device for vehicle, the power-control unit cooling pump, the oil pump, and the engine cooling pump may be aligned in this order adjacent to the electric motor. The power-control unit cooling pump, the oil pump, and the engine cooling pump may be connected to a transmission shaft connected to the electric motor. The differential mechanism may be positioned between the oil pump and the engine cooling pump. The engine cooling pump may be configured to be separated from the transmission shaft by turning-off of the differential mechanism.

In the first cooling device for vehicle, the differential mechanism may include an on/off mechanism. The on/off mechanism may switch transmission of the rotary power between the electric motor and the engine cooling pump between on and off.

In the first cooling device for vehicle, the differential mechanism may include a transmission assembly interposed between the electric motor and the engine cooling pump.

A second cooling device for vehicle according to the present application includes: an electric motor; an engine cooling pump; an oil pump; and a differential mechanism. The engine cooling pump is configured to allow an engine cooling water to flow by rotary power of the electric motor. The oil pump is configured to allow an, oil for transaxle to flow by the rotary power of the electric motor. The differential mechanism makes a flowrate of the engine cooling pump different from a flow/rate of the oil pump by controlling, transmission of the rotary power from the electric motor.

In the second cooling device for vehicle, the differential mechanism may include an on/off mechanism. The on/off mechanism may switch transmission of the rotary power between the electric motor and the engine cooling pump between on and off.

In the second cooling device for vehicle, the differential mechanism may include a transmission assembly interposed between the electric motor and the engine cooling pump.

A third cooling device for vehicle include: an electric motor; a power-control unit cooling pump; an oil pump; and a differential mechanism. The power-control unit cooling pump is configured to allow a cooling liquid for power control unit to flow by the rotary power of the electric motor. The oil pump is configured to allow an oil for transaxle to flow by the rotary power of the electric motor. The differential mechanism makes a flowrate of the power-control unit cooling pump different from a flowrate of the oil pump by controlling transmission of the rotary power from the electric motor.

In the third cooling device for vehicle, the differential mechanism may include an on/off mechanism. The on/off mechanism may switch transmission of the rotary power between the electric motor and the engine cooling pump between on and off.

In the third cooling device for vehicle, the differential mechanism may include a transmission assembly interposed between the electric motor and the engine cooling pump.

DETAILED DESCRIPTION

First Embodiment

Figure 1:
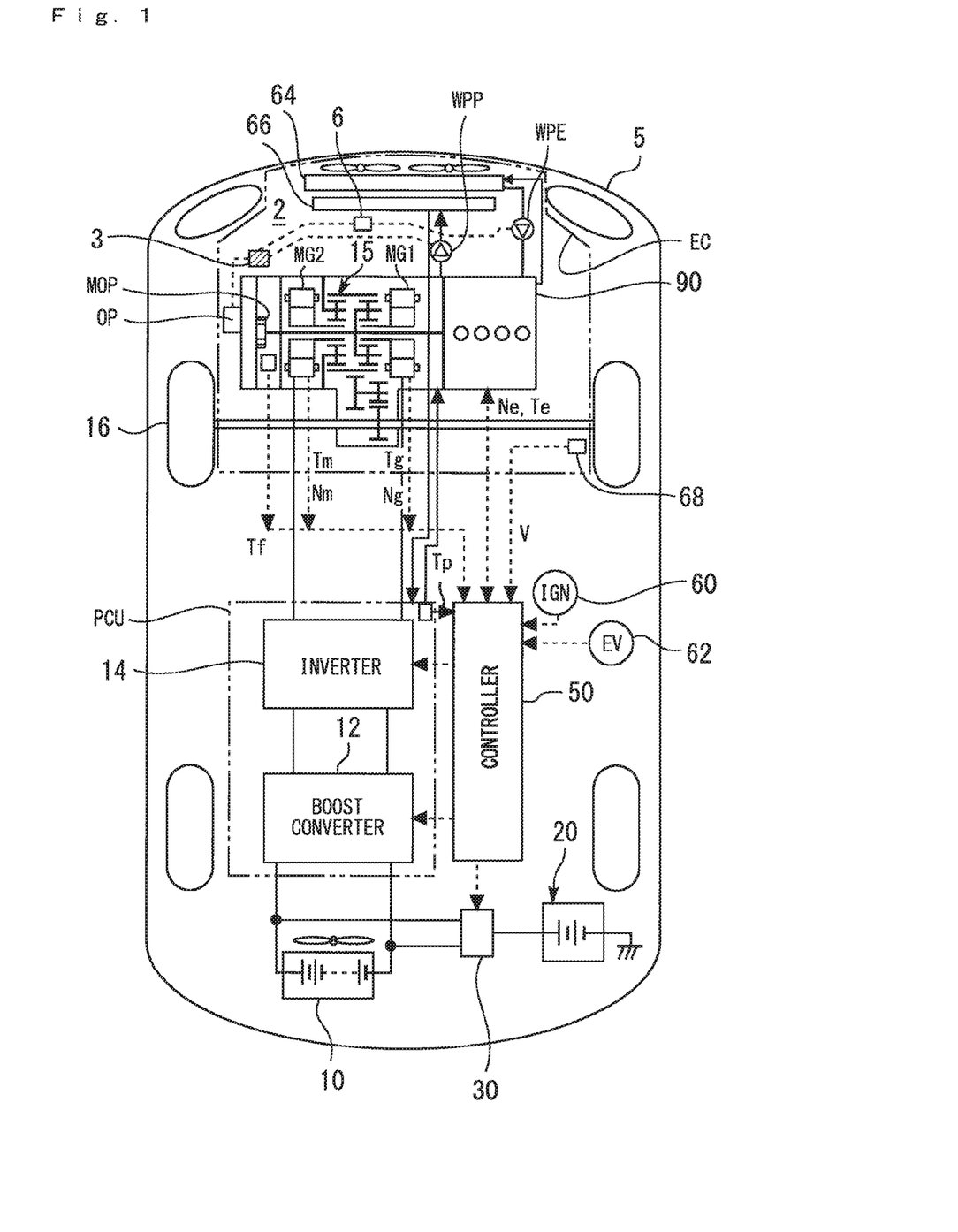
FIG. 1 is a diagram illustrating configuration of an electric vehicle in this embodiment.

FIG. 1 is a diagram illustrating configuration of an electric vehicle 5 in this embodiment. As illustrated in FIG. 1, the electric vehicle 5 includes a driving wheel 16, an engine 90, a power dividing mechanism 15, a power control unit PCU, and a cooling device 2 for vehicle. The electric vehicle 5 includes a transaxle. The transaxle includes a motor generator MG1, a motor generator MG2, and the power dividing mechanism 15. In the following description and drawings, the transaxle is abbreviated as "T/A" in some cases.

The electric vehicle 5 is a hybrid vehicle on which the motor generator MG2 and the engine 90 are mounted as driving sources. A running mode of the electric vehicle 5 includes an EV mode and an HV mode. The EV mode is a mode of running by using mainly the motor generator MG2. The HV mode is a mode in which a ratio of running by using the engine 90 with the motor generator MG2 at the same time is higher than that in the EV mode.

The power control unit PCU includes a boost converter 12 and an inverter 14. The electric vehicle 5 includes a high-voltage battery 10. The boost converter 12 boosts DC power output from the high-voltage battery 10. The inverter 14 sends the DC power to the boost converter 12 in one operation mode, and the inverter 14 also receives the DC power from the boost converter 12 in other operation mode.

The electric vehicle 5 includes the motor generator MG1 and the motor generator MG2. The motor generator MG1 generates power by receiving power of the engine 90 through the power dividing mechanism 15. A rotating shaft of the motor generator MG2 is connected to the power dividing mechanism 15. The inverter 14 is connected to the motor generator MG1 and the motor generator MG2. The inverter 14 performs conversion between AC power from the motor generator MG1 and the DC power from the boost converter 12.

Various well-known mechanisms including a planetary gear mechanism and a speed reduction gear mechanism are used as the power dividing mechanism 15. The power dividing mechanism 15 plays a role of dividing the power between the engine 90 and the motor generators MG1 and MG2. An automobile with high energy efficiency in general is realized by operating the engine 90 in a most efficient region while a vehicle speed is controlled by driving the motor generator MG2 by controlling a power generation amount of the motor generator MG1.

The high-voltage battery 10 which is a DC power supply supplies the DC power to the boost converter 12. On the other hand, the high-voltage battery 10 is charged by the DC power from the boost converter 12 in a charging mode.

The boost converter 12 boosts a DC voltage received from the high-voltage battery 10 and supplies the boosted DC voltage to the inverter 14. The inverter 14 converts the supplied DC voltage to the AC voltage. The inverter 14 drives and controls the motor generator MG1 at engine start. After the engine start, the AC power generated by the motor generator MG1 is converted by the inverter 14 to the DC. The converted DC power is converted to a voltage appropriate for charging the high-voltage battery 10 by the boost converter 12. The high-voltage battery 10 is charged by the voltage converted by the boost converter 12.

The inverter 14 drives the motor generator MG2. The motor generator MG2 is a running motor for driving the driving wheel 16 by assisting the engine 90. The motor generator MG2 performs a regenerative operation during braking and converts rotary energy of the wheel to electric energy. The obtained electric energy is returned to the high-voltage battery 10 via the inverter 14 and the boost converter 12.

The electric vehicle 5 further includes an auxiliary battery 20 and a DC/DC converter 30. The auxiliary battery 20 supplies a power voltage to accessories (not shown). The DC/DC converter 30 converts the voltage of the high-voltage battery 10 and charges the auxiliary battery 20. Though not shown, the electric vehicle 5 includes a voltage sensor for detecting a voltage of the high-voltage battery 10, a current sensor for detecting an electric current of the high-voltage battery 10, and a voltage sensor for detecting a voltage of the auxiliary battery 20.

The electric vehicle 5 further includes an engine cooling system. The engine cooling system includes a radiator 64 for cooling a cooling water of the engine 90, and the engine cooling system farther includes an engine cooling pump WPE.

The electric vehicle 5 further includes an electric device cooling-system for a hybrid system. The electric device cooling system includes a radiator 66 for cooling a cooling water of the hybrid system and a power-control unit cooling pump WPP.

The electric vehicle 5 further includes a mechanical oil pump MOP and an oil pump OP. The mechanical oil pump MOP and the oil pump OP circulate ATF (oil for automatic transmission) in a transaxle. The ATF is used for cooling and lubrication of the transaxle.

The engine cooling pump WPE, the power control unit cooling pump WPP, and the oil pump OP are included in the cooling device 2 for vehicle which will be described later.

The electric vehicle 5 includes an engine compartment EC. The engine 90, the power dividing mechanism 15, the motor generators MG1 and MG2, and the radiators 64 and 66 are accommodated in this engine compartment EC.

In an actual structure of the electric vehicle 5 according to the first embodiment, the power control unit PCU is also accommodated in the engine compartment EC. However, in order to facilitate understanding of description, the power control unit PCU is illustrated outside the engine compartment EC for convenience in FIG. 1.

The electric vehicle 5 further includes an ignition key switch 60 for starting the hybrid system, an EV priority switch 62 by which a user designates the EV mode/HV mode, and a controller 50. In the first embodiment, the controller 50 includes a plurality of ECU (Electronic Control Unit).

More specifically, the controller 50 includes an HV-ECU for managing the entire hybrid system, an MG-ECU for controlling the inverter 14, an EN-ECU for controlling the engine 90, and a battery ECU for detecting a state of charge (i.e. SOC) of the high-voltage battery 10. However, the controller 50 may be configured to include one or a plurality of computers as a modification.

The controller 50 receives various signals from various sensors provided in the electric vehicle 5. The controller 50 receives a vehicle speed signal V from a vehicle speed sensor 68. The controller 50 receives a rotation speed Ng of the motor generator MG1 and a rotation speed Nm of the motor generator MG2 from rotation sensors provided in the transaxle. The controller 50 receives an engine speed Ne from a rotation sensor provided in the engine 90.

The controller 50 receives a temperature Tg of the motor generator MG1, a temperature Nm of the motor generator MG2, and a transaxle temperature Tf from temperature sensors provided in the transaxle. In the first embodiment, the transaxle temperature Tf is an oil temperature Tf. The oil temperature Tf is obtained by detecting an oil temperature of ATF which is pressure-fed by the oil pump OP.

The controller 50 receives an engine temperature Te from a temperature sensor provided in the engine 90. More specifically, in the first embodiment, the engine temperature Te is expressed by a cooling water temperature Te. The cooling water temperature Te is an output of the temperature sensor for detecting a temperature of the engine cooling water which is pressure-fed by the engine cooling pump WPE.

The controller 50 receives the temperature Tp of the power control unit from a temperature sensor provided in the power control unit PCU. More specifically, in the first embodiment, the temperature Tp is expressed by the cooling water temperature Tp. The cooling water temperature Tp is an output of the temperature sensor for detecting a temperature of the cooling water pressure-fed by the power-control unit cooling pump WPP.

Figure 2:
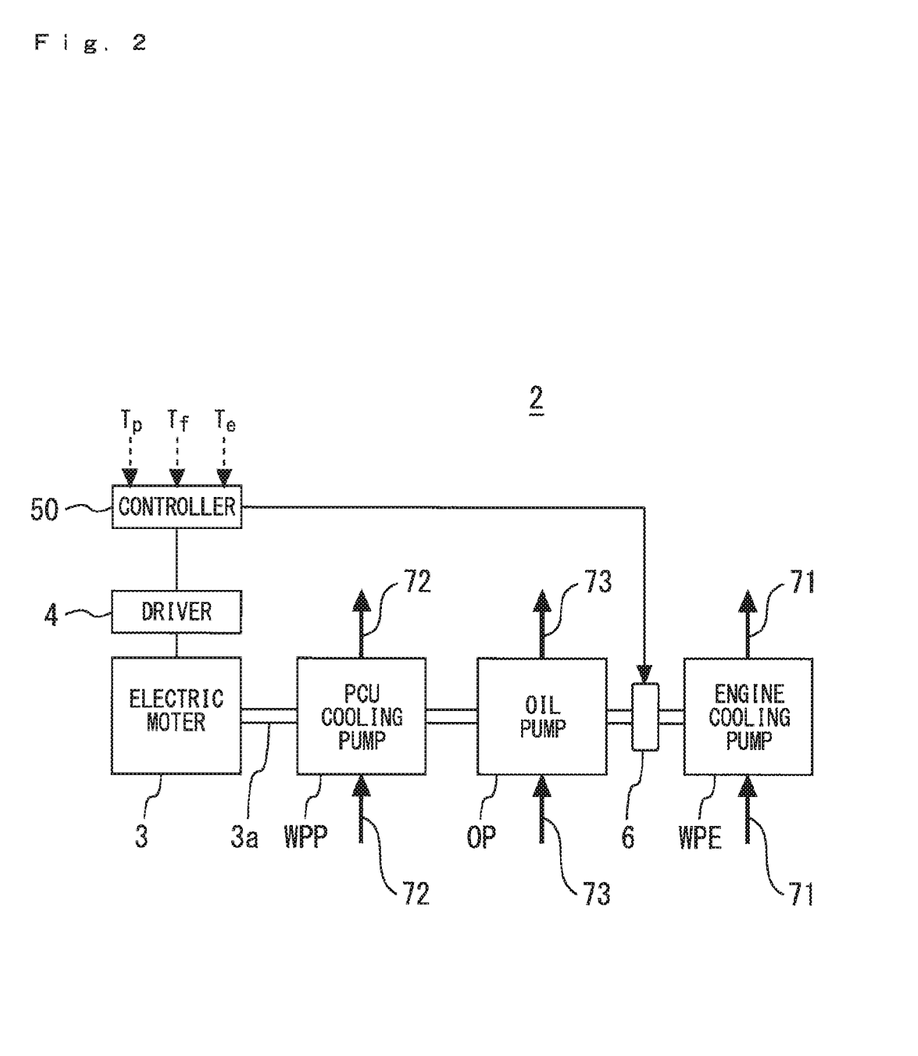
FIG. 2 is a configuration diagram illustrating the cooling device for vehicle according to the first embodiment.

FIG. 2 is a configuration diagram illustrating the cooling device 2 for vehicle according to the first embodiment. The cooling device 2 for vehicle includes an electric motor 3, a driver 4, the engine cooling pump WPE, the power-control unit cooling pump WPP, the oil pump OP, and a differential mechanism 6. The driver 4 is not shown in FIG. 1 but it is a component provided for control of a driving state of the electric motor 3.

In the first embodiment, the power-control unit cooling pump WPP, the oil pump OP, and the engine cooling pump WPE are aligned in this order adjacent to the electric motor 3. The electric motor 3 drives the engine cooling pump WPE, the power-control unit cooling pump WPP, and the oil pump OP by transmitting rotary power through a transmission mechanism 3a.

The electric motor 3 may be driven by power of the auxiliary battery 20. In the first embodiment, the transmission mechanism 3a may be a transmission shall, but the transmission mechanism 3a may include at least one transmission element such as a gear as a modification.

As illustrated in FIG. 2, in the first embodiment, the electric motor 3 and the power-control unit cooling pump WPP are adjacent to each other.

The engine cooling pump WPE receives rotary power of the electric motor 3 through the transmission mechanism 3a. The engine cooling pump WPE is an electric water pump but its power source is the electric motor 3 provided outside the pump body of the engine cooling pump WPE. The engine cooling pump WPE is driven by the rotary power of the electric motor 3 and allows the cooling water to flow through a cooling water passage 71. That is, the engine cooing pump WPE is configured to allow the engine cooling water to glow by the rotary power of the electric motor 3. The engine cooling pump WlPE circulates the cooling water through the engine 90 and the radiator 64.

The power-control unit cooling pump WPP receives the rotary power of the electric motor 3 through, the transmission mechanism 3a. The power-control unit cooling pump WPP is an electric water pump and its power source is the electric motor 3 provided outside the pump body of the power-control unit cooling pump WPP. The power-control unit cooling pump WPP is driven by the rotary power of the electric motor 3 and allows the cooling water to flow through the cooling water passage 72.

That is, the power-control unit cooling pump WPP is constructed to allow a cooling fluid for power control unit by the rotary power of the electric motor 3. The power-control unit cooling pump WPP circulates the cooling water through the transaxle, the power control unit PCU, and the radiator 64.

The oil pump OP receives the rotary power of the electric motor 3 through, the transmission mechanism 3a. The oil pump OP is an electric oil pump but its power source is the electric motor 3 provided outside the pump body of the oil pump OP. The oil pump OP is driven by the rotary power of the electric motor 3 and allows the ATF to flow through the oil passage 73. That is, the oil pump OP is constructed to allow oil for transaxle to flow by the rotary power of the electric motor 3.

The differential mechanism 6 makes a flowrate of the engine cooling pump WPE different from the flowrates of the power-control unit cooling pump WPP and the oil pump OP by adjusting the rotary power transmitted from the electric motor 3. As illustrated in FIG. 2, the differential mechanism 6 according to the first embodiment is provided between the oil pump OP and the engine cooling pump WPE. The differential mechanism 6 changes a relationship between the rotation speed of the engine cooling pump WPE during driving and the rotation speed of the electric motor 3.

More specifically, the differential mechanism 6 according to the first embodiment is an on/off mechanism. The differential mechanism 6 switches transmission of the rotary power between the electric motor 3 and the engine cooling pump WPF, between on and off. It can be so configured that the rotary power of the electric motor 3 is transmitted to the power-control unit cooling pump WPP and the oil pump OP, while the rotary power of the electric motor 3 is not transmitted to the engine cooling pump WPE by separating the engine cooling pump WPE from the transmission mechanism 3a.

As described above, according to the first embodiment, while the same electric motor 3 is used in common, driving of the engine cooling pump WPE and driving of the power-control unit cooling pump WPP and the oil pump OP can be performed individually in accordance with a use situation. As a result, costs can be drastically reduced as compared with a case where the exclusive electric motor 3 is provided in each pump.

That is, the electric motor and the driver play a great role in the electric pump in general, and the electric motor and the driver are particularly high-cost components in the electric pump. The electric motors and the drivers have been usually provided in the same numbers as that of the pumps in order to individually control each of the electric pumps, but such a method has a problem of incurring an increase in the costs. In this regard, in the first embodiment, costs can be drastically reduced in the entire cooling device 2 for vehicle by causing the electric motor 3 and the driver 4 to be used in common by the plurality of pumps.

In the electric vehicle which is a hybrid vehicle, the engine is stopped during driving of a running electric motor in some cases. By using the differential mechanism 6 in this non operation time of the engine, unnecessary driving of the engine cooling pump WPE can be suppressed when engine cooling is not intrinsically required. As a result, driving of the engine cooling pump WPE can be reduced, and power consumption can be suppressed.

Particularly in the first embodiment, since three pumps can be driven by the one electric motor 3, a cost reduction effect is extremely high.

Moreover, in the first embodiment, the differential mechanism 6 is provided for separation of the engine cooling pump WPE, while the power-control unit cooling pump WPP and the oil pump OP are driven synchronously at all times. As a result, configuration can be simplified.

Moreover, since the differential mechanism 6 is the on/off mechanism in the first embodiment, the structure of the differential mechanism 6 can be simplified.

Moreover, there is a merit that the cooling effect of the electric motor 3 can be obtained by aligning the electric motor 3 adjacent to the power-control unit cooling pump WPP. In this case of being "adjacent", there may be no element disturbing heat transfer between the two components. For example, the "adjacent arrangement" may be achieved based on any one of the following first to third structures: the first structure is a structure in which there are no other components between a casing of the electric motor 3 and a casing of the pump; the second structure is a structure in which a casing of the electric motor 3 and a casing of the pump are in direct contact; and the third structure is a structure in which a casing of the electric motor 3 and a casing of the pump are brought into contact through a heat conductive member. The "adjacent arrangement" also applies to a modification in FIG. 4 which will be described below.

Figure 3:
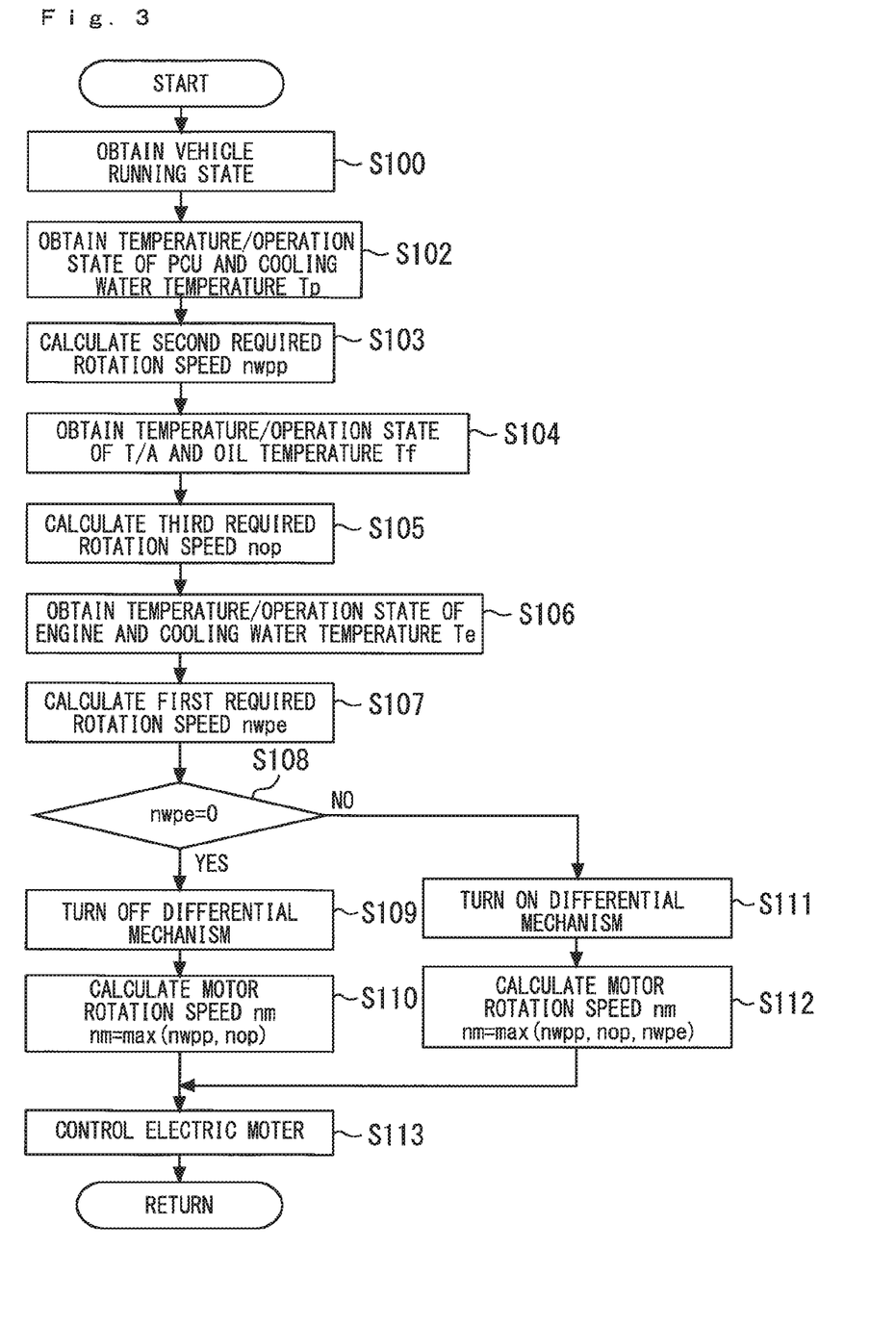
FIG. 3 is a flowchart illustrating specific control executed by the cooling device for vehicle according to the first embodiment.

FIG. 3 is a flowchart illustrating specific control executed by the cooling device 2 for vehicle according to the first embodiment. FIG. 3 is an example of the control executed by the controller 50 in the first embodiment.

Terms used for convenience in the following description will be stated. A required rotation speed for the engine cooling pump WPE as described as a "first required rotation speed nwpe". The required rotation speed for the power-control unit cooling pump WPP is described as a "second required rotation speed nwpp". The required rotation speed for the oil pump OP is described as a "third required rotation speed nop". A motor rotation speed of the electric motor 3 is described as a "motor rotation speed nm".

In a routine in FIG. 3, first, the controller 50 obtains a running state of the electric vehicle 5 (Step S100). Information such as a vehicle speed and a running mode is obtained, for example.

Subsequently, the controller 50 obtains a temperature and an operation state of the power control unit PCU and the temperature Tp based on the cooling water of the power-control unit cooling pump WPP (Step S102).

Subsequently, the controller 50 calculates the second required rotation speed nwpp (Step S103). The second required rotation speed nwpp is calculated on the basis of the information obtained at Step S102. The second required rotation speed nwpp is a rotation speed for ensuring a necessary cooling water flowrate for keeping the power control unit PCU within an allowable temperature range determined in advance, for example.

Subsequently, the controller 50 obtains the temperature and the operation state of the transaxle and a temperature Tf based on the oil temperature of the oil pump OP (Step S104).

Subsequently, the controller 50 calculates the third required rotation speed nop (Step S105), The third required rotation speed nop is calculated on the basis of the information obtained at Step S104. The third required rotation speed nop is a rotation speed for ensuring a necessary oil flowrate for keeping the transaxle within an allowable temperature range determined in advance, for example.

Subsequently, the controller 50 obtains the temperature and the operation state of the engine 90 and the temperature Te based on the cooling water of the engine cooling pump WPE (Step S106).

Subsequently, the controller 50 calculates the first required rotation speed nwpe (Step S107). The first required rotation speed nwpe is calculated on the basis of the information obtained at Step S106. The first required rotation speed nwpe is a rotation speed for ensuring a necessary cooling water flowrate for keeping the engine 90 within an allowable temperature range determined in advance, for example.

Subsequently, the controller 50 determines whether nwpe=0 is completed or not (Step S108). If nwpe=0 is completed, the required rotation speed of the engine cooling pump WPE is zero. That is, in this case, the engine cooling pump WPE may be stopped.

If the determination result at Step S108 is affirmative (YES), the controller 50 turns off the differential mechanism 6 (Step S109).

After Step S109, the controller 50 calculates the motor rotation speed nm Step S110). At Step S110, the motor rotation speed nm is calculated on the basis of max (nwpp, nop). Reference character max (nwpp, nap) is a function prepared in advance so that a maximum rotation speed in the two required rotation speeds nwpp and nop is calculated as the motor rotation speed nm. The function of max (nwpp, nop) is stored in the controller 50 in advance as a form of a formula or a map.

On, the other hand, if the determination result at Step S108 is negative (NO), the controller 50 turns on the differential mechanism 6 (Step S111).

After Step S111, the controller 50 calculates the motor rotation speed ran (Step S112). At Step S112, the motor rotation speed nm is calculated on the basis of max (nwpp, nop, nwpe). Reference character max (nwpp, nap, nwpe) is a function prepared in advance so that a maximum rotation speed in the three required rotation speeds nwpp, nap, and nwpe is calculated as the motor rotation speed pun. The function of max (nwpp, nap, nwpe) is stored in the controller 50 in advance as a form of a formula or a map.

When processing at Step S110 or S112 is executed, then, the controller 50 controls the electric motor 3 so that the calculated motor rotation speed nm is achieved (Step S113). After that, the processing returns.

Figure 4:
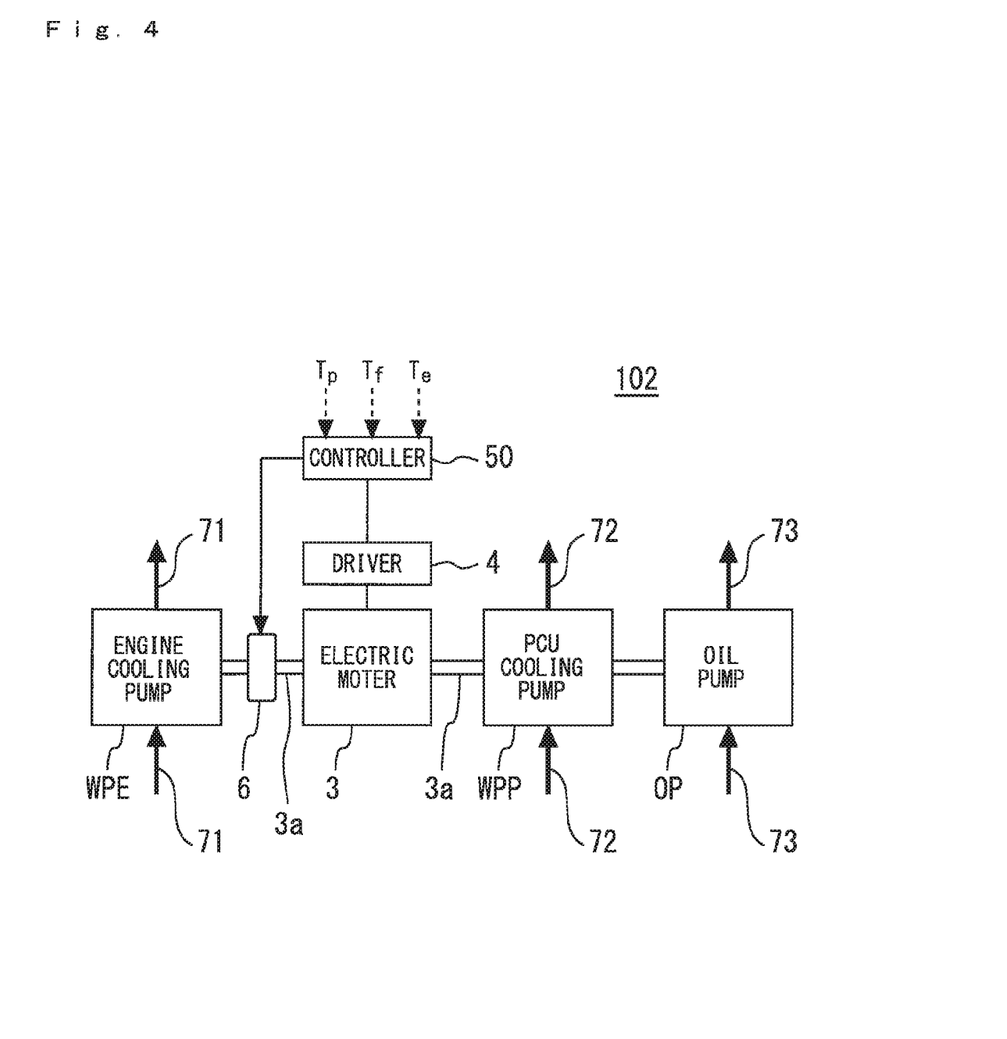
FIG. 4 is a configuration diagram illustrating a cooling device for vehicle according to a modification of the first embodiment.

According to the aforementioned specific processing, driving requests of the three pumps are calculated, and on/off of the differential mechanism 6 and the motor rotation speed of the electric motor 3 can be controlled on the basis of the driving requests. As a result, an increase in driving power consumption of the electric motor 3 can be suppressed while overheating of devices to be cooled of each pump is suppressed, FIG. 4 is a configuration diagram illustrating a cooling device 102 for vehicle according to a modification of the first embodiment. In this modification, the electric motor 3 is sandwiched between the power-control unit cooling pump WPF and the engine cooling, pump WPE illustrated in FIG. 4. There is a merit that the electric motor 3 can be further efficiently cooled by aligning the two cooling pumps adjacent to the electric motor 3.

Second Embodiment

Figure 5:
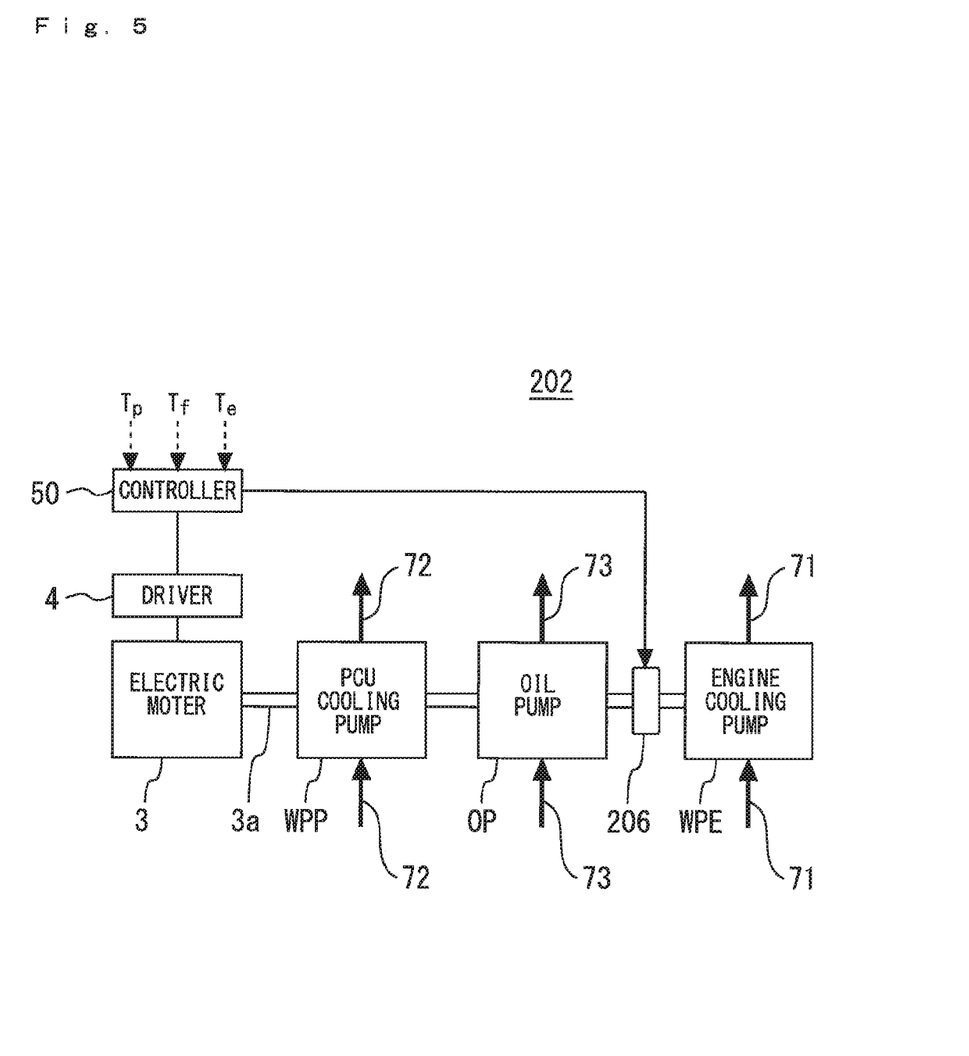
FIG. 5 is a configuration diagram illustrating a cooling device for vehicle according to a second embodiment.

FIG. 5 is a configuration diagram illustrating a cooling device 202 for vehicle according to a second embodiment. The cooling device 202 for vehicle has a differential mechanism 206 replaced with the differential mechanism 6 of the cooling device 2 for vehicle according to the first embodiment. Except for this point, the cooling device 202 for vehicle includes configuration similar to that of the cooling device 2 for vehicle. Moreover, the cooling device 202 for vehicle is mounted on the electric vehicle 5 similarly to the cooling device 2 for vehicle.

The differential mechanism 206 makes the flowrate of the engine cooling pump WEE different from the flowrates of the power-control unit cooling pump WPP and the oil pump OP by adjusting the rotary power transmitted from the electric motor 3. The differential mechanism 206 changes a relationship between the rotation speed of the engine cooling pump WPE during, driving and the rotation speed of the electric motor 3.

More specifically, the differential mechanism 206 is a transmission assembly interposed between the electric motor 3 and the engine cooling pump WEE. The differential mechanism 206 can transmit the rotary power from the transmission mechanism 3a to the engine cooling pump WEE. It should be noted that a rotation speed of the engine cooling pump WPE is different from the rotation speed of the transmission mechanism 3a since the differential mechanism 206 changes the rotation speed therebetween. Since various well-known transmission assemblies can be applied as the transmission assembly of the differential mechanism 206, description on the specific structure is omitted.

By transmitting the changed rotation speed of the transmission mechanism 3a to the engine cooling pump WEE, while the rotary power of the electric motor 3 is transmitted to the power-control unit cooling pump WPP and the oil pump OP, a driving three with a rotation speed different from those pumps can be given to the engine cooling pump WPE. Moreover, since the differential mechanism 206 is a transmission assembly, the differential mechanism 206 can control a cooling medium flowrate of each pump more accurately and with more freedom.

The differential mechanism 206 according to the second embodiment is more specifically configured so as to be capable of changing a speed ratio r to an arbitrary value between a minimum value rmin and a maximum value rmax. The speed ratio r corresponds to a ratio obtained by dividing the rotation speed of the engine cooling pump WPE during driving by the motor rotation speed of the electric motor 3. The minimum value rmin is set in advance within a range of 0≤rmin<1.

Figure 6:
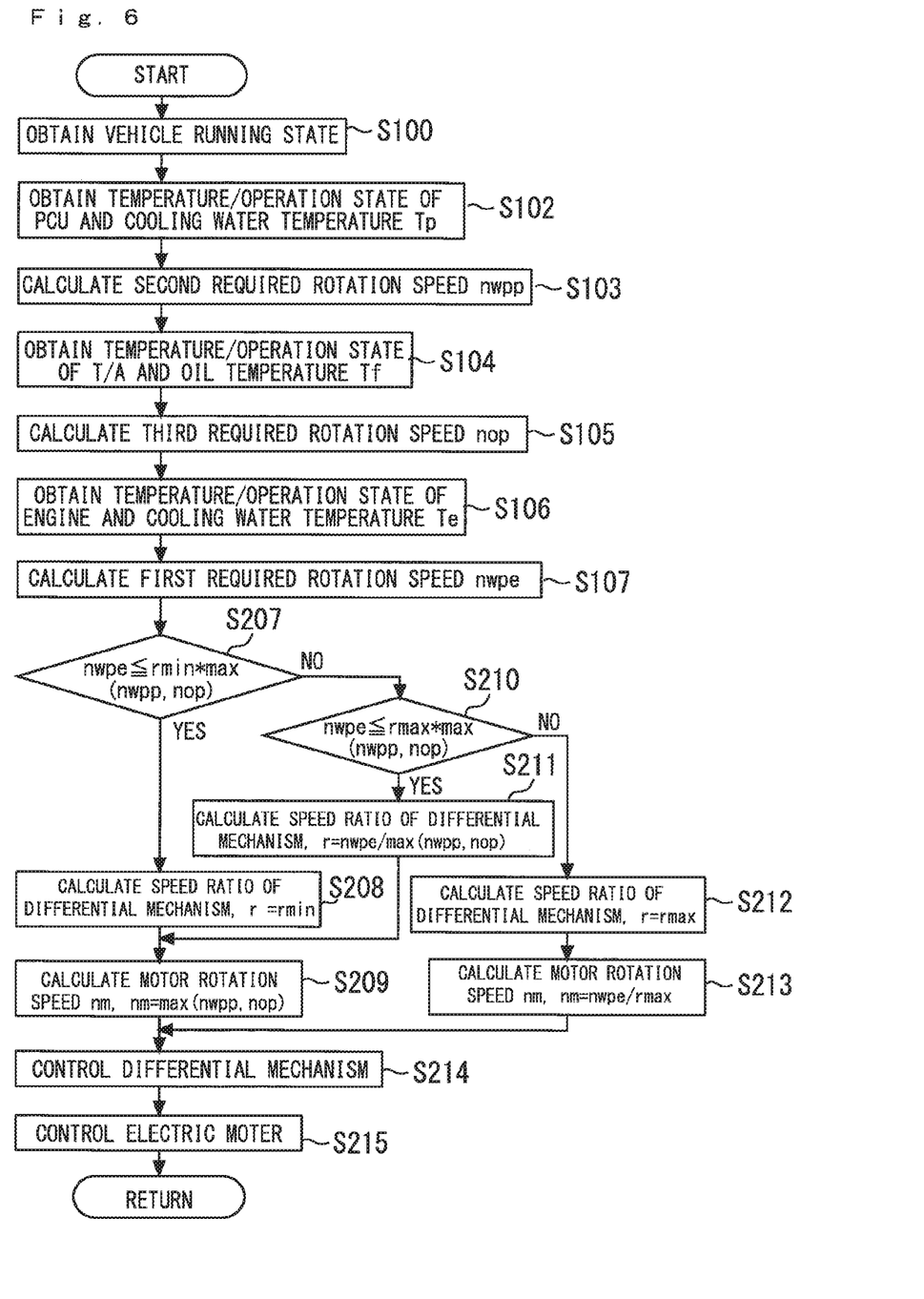
FIG. 6 is a flowchart illustrating specific control executed in the cooling device for vehicle according to the second embodiment.

FIG. 6 is a flowchart illustrating specific control executed in the cooling device 202 for vehicle according to the second embodiment, FIG. 6 is an example of the control executed by the controller 50 in the second embodiment.

In the routine in FIG. 6, first, processing at Steps S100 and S102 to S107 is executed similarly to the flowchart in FIG. 3 according to the first embodiment.

Subsequently, the controller 50 determines whether a first inequality (1) below is completed or not (Step S207):

$$nwpe \le r \text{ min} \times \text{max}(nwpp, nop) \quad (1)$$

If the aforementioned first inequality (1) is completed at Step S207, the controller 50 sets the speed ratio r of the differential mechanism 206 to rmin (Step S208).

After Step S208, the controller 50 calculates the motor rotation speed nm in conformity with the following equation similarly to the processing at Step S110 of the first embodiment:

$$nm = \max(nwpp, nop)$$

On the other hand, if the aforementioned first inequality (1) is not completed at Step S207, the controller 50 determines whether the following second inequality (2) is completed or not (Step S210):

$$nwpe \le r \text{ max} \times \text{max}(nwpp, nop) \quad (2)$$

If the aforementioned second inequality is completed at Step S210, the controller 50 calculates the speed ratio r of the differential mechanism 206 in conformity to the following first speed ratio equation (3) (Step S211):

$$r = nwpe / \max(nwpp, nop) \quad (3)$$

After Step S208, the controller 50 executes calculation of the motor rotation speed nm at the aforementioned Step S209.

On the other hand, if the second inequality (2) is not completed at Step S210, the controller 50 sets the speed ratio r of the differential mechanism 206 to rmax (Step S212).

After Step S212, the controller 50 calculates the motor rotation speed nm in conformity to the following equation (Step S213):

$$nm = nwpe / r \text{ max}$$

After the processing at Step S209 or S213 is executed, the controller 50 controls the differential mechanism 206 so that the speed ratio r set at the current point of time is achieved (Step S214).

Subsequently, the controller 50 controls the electric motor 3 so as to obtain the motor rotation speed nm calculated at the current point of time (Step S215). After that, the processing returns.

According to the aforementioned specific processing, the driving requests of the three pumps can be calculated, and the speed ratio r of the differential mechanism 206 and the motor rotation speed of the electric motor 3 can be controlled on the basis of them. As a result, an increase in driving power consumption of the electric motor 3 can be suppressed while overheating of devices to be cooled of each pump is suppressed.

Figure 7:
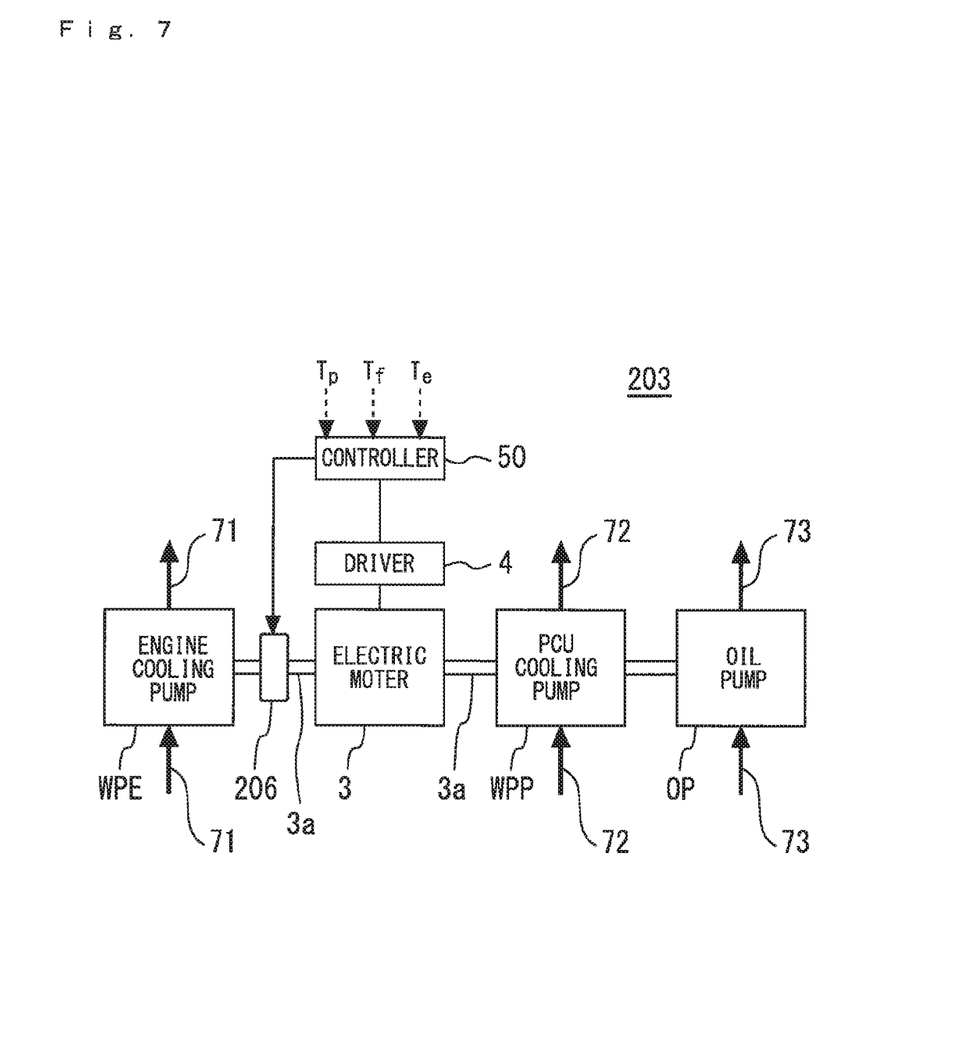
FIG. 7 is a configuration diagram illustrating a cooling device for vehicle according to a modification of the second embodiment.

FIG. 7 is a configuration diagram illustrating a cooling device 203 for vehicle according to a modification of the second embodiment. In the modification in FIG. 7, the electric motor 3 is sandwiched between the power-control unit cooling pump WPP and the engine cooling pump WPE similarly to the modification in FIG. 4 according to the first embodiment.

In the first and second embodiments, the three pumps are connected to the electric motor 3. However, the electric motor 3 may be configured to drive two pumps instead of three. Arbitrary two of the engine cooling pump WPE, the power-control unit cooling pump WPP, and the oil pump OP may be selected as the two pumps driven by the electric motor 3.

That is, in FIGS. 2, 4, 5, and 7, any arbitrary one of the engine cooling pump WPE, the power-control unit cooling pump WPP, and the oil pump OP may be omitted. The omitted pump only needs to be driven by another electric motor.

More specifically, configuration as below may be provided as a modification. FIGS. 8 to 13 are configuration diagrams illustrating cooling devices 302 to 307 for vehicle according to the modifications of the first embodiment.

Figure 8:
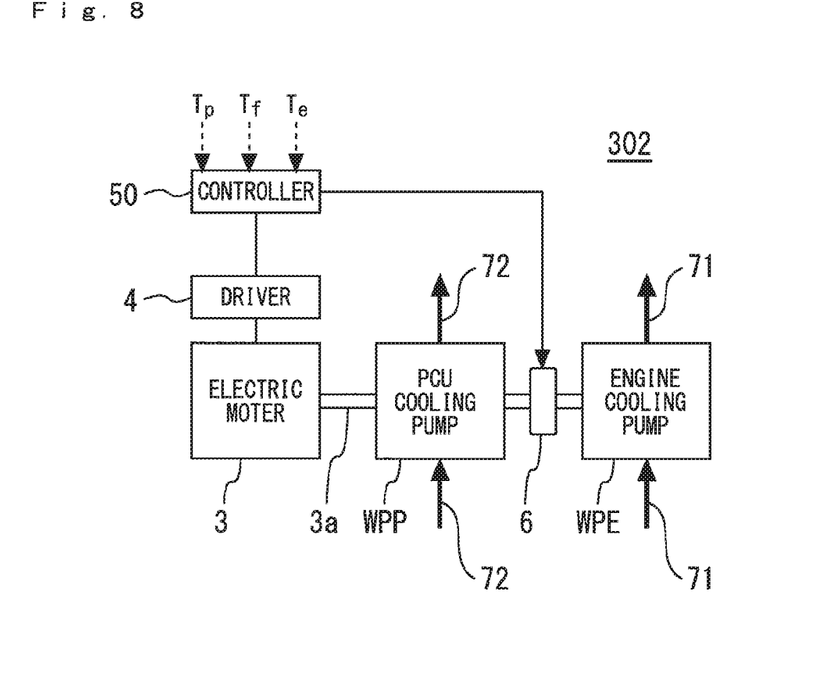
FIG. 8 is a configuration diagram illustrating a cooling device for vehicle according to the modifications of the first embodiment.
Figure 9:
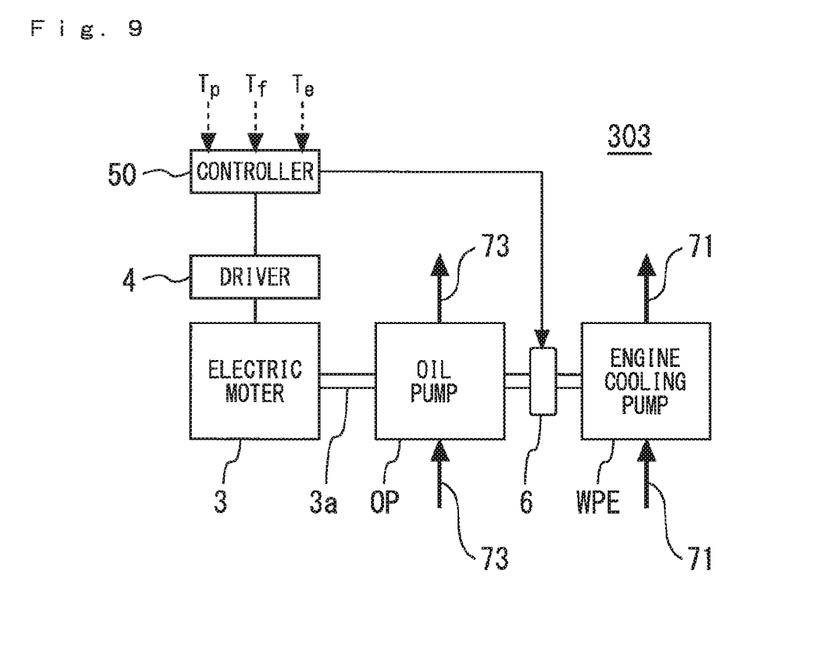
FIG. 9 is a configuration diagram illustrating a cooling device for vehicle according to the modifications of the first embodiment.
Figure 10:
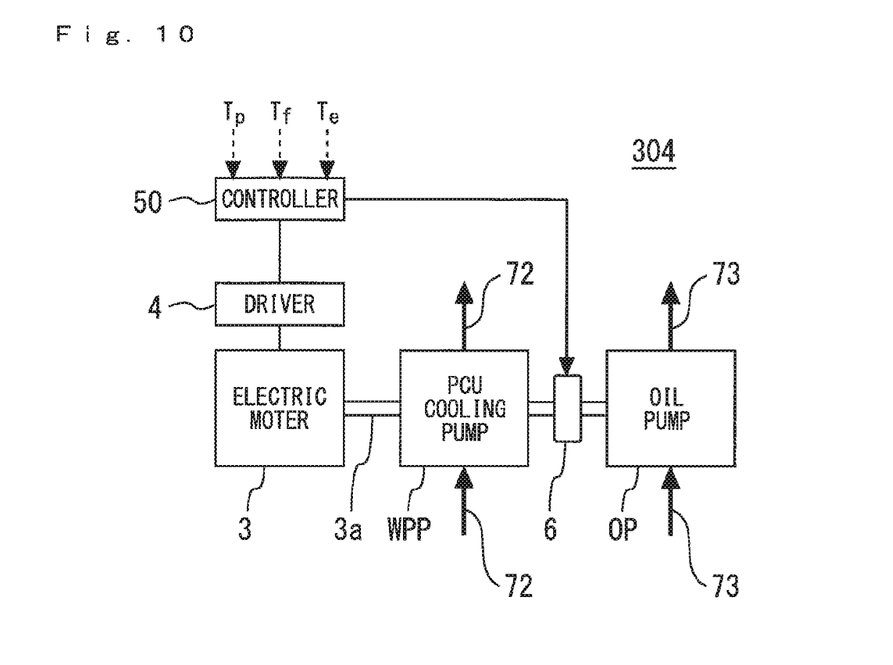
FIG. 10 is a configuration diagram illustrating a cooling device for vehicle according to the modifications of the first embodiment.

FIG. 8 is a diagram in which the oil pump OP in FIG. 2 is omitted. FIG. 9 is a diagram in which the power-control unit cooling pump WPP in FIG. 2 is omitted. FIG. 10 is a diagram in which the engine cooling pump WPE in FIG. 2 is omitted, and the differential mechanism 6 is provided between the power-control unit cooling pump WPP and the oil pump OP.

Figure 11:
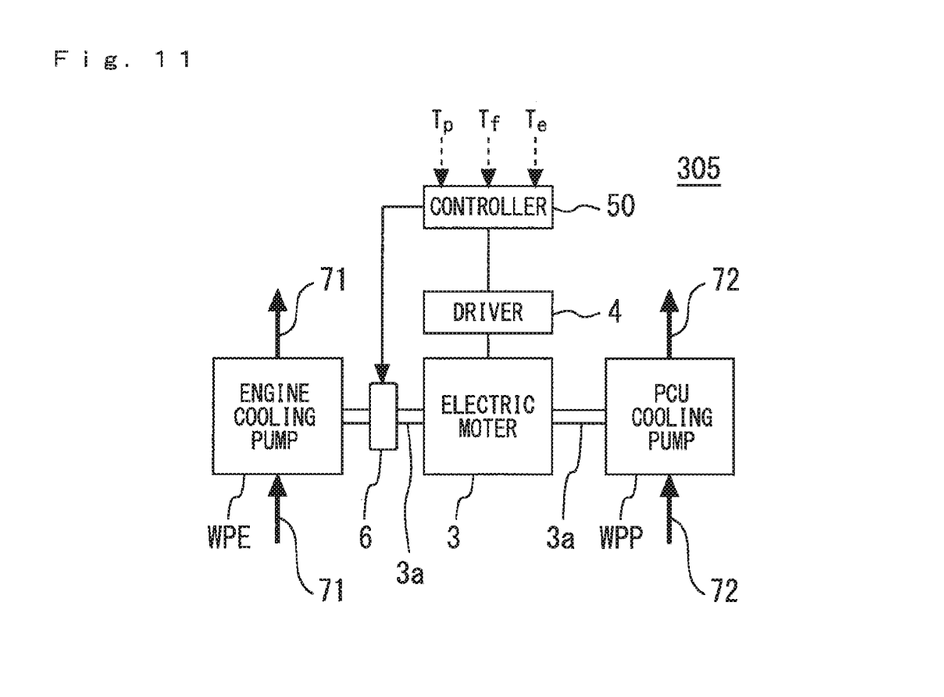
FIG. 11 is a configuration diagram illustrating a cooling device for vehicle according to the modifications of the first embodiment.
Figure 12:
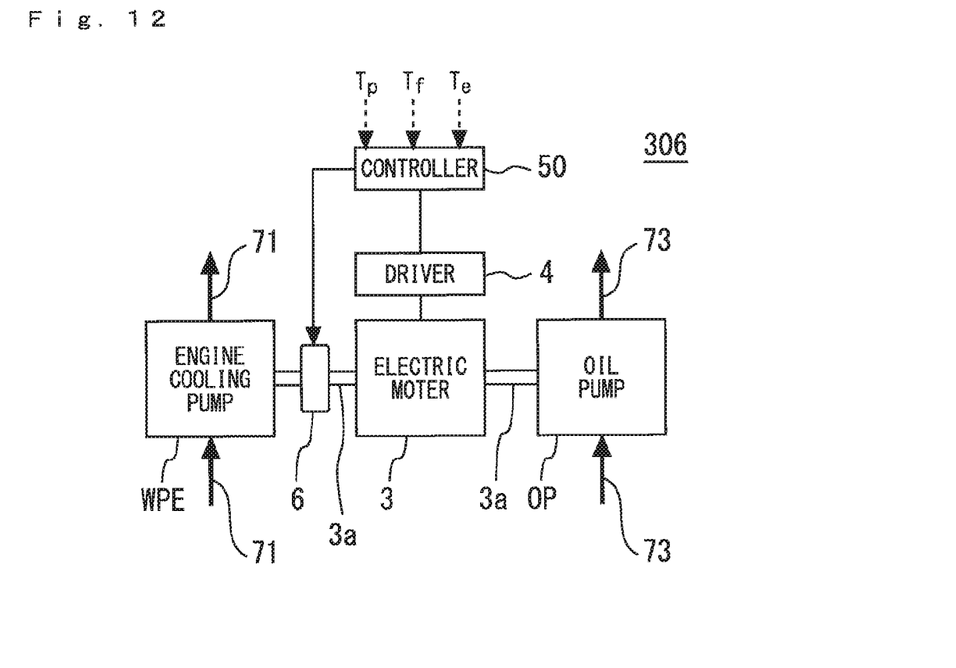
FIG. 12 is a configuration diagram illustrating a cooling device for vehicle according to the modifications of the first embodiment.
Figure 13:
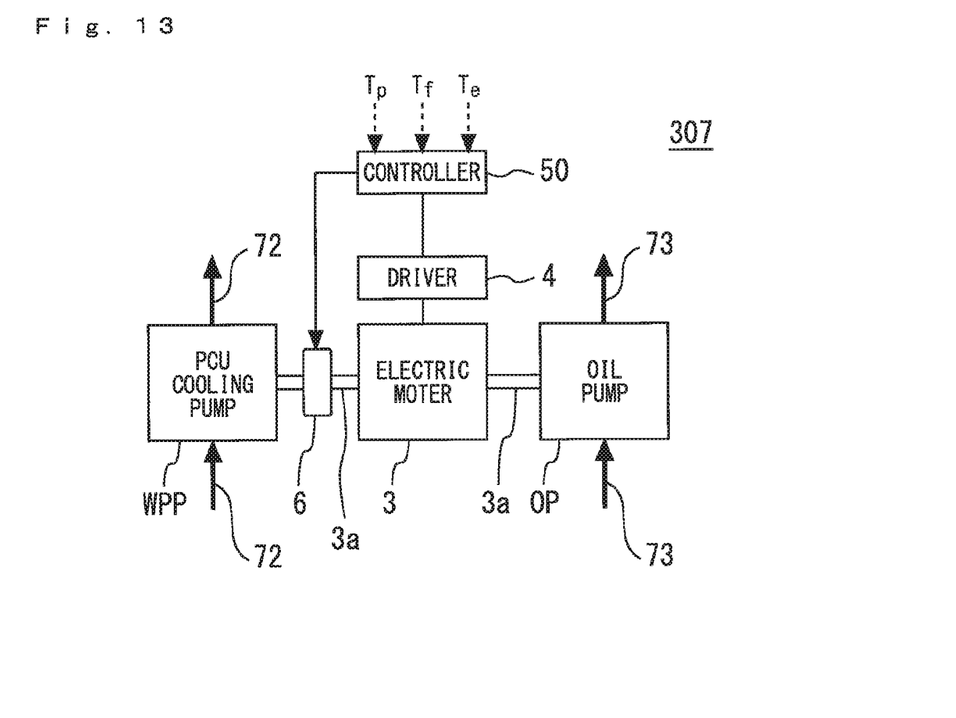
FIG. 13 is a configuration diagram illustrating a cooling device for vehicle according to the modifications of the first embodiment.

FIG. 11 is a diagram in which the oil pump OP in FIG. 4 is omitted. FIG. 12 is a diagram in which the power-control unit cooling pump WPP in FIG. 4 is omitted. FIG. 13 is a diagram in which the engine cooling pump WPE in FIG. 4 is omitted, and the differential mechanism 6 is provided between the power-control unit cooling pump WPP and the electric motor 3.

In the modifications of the first embodiment illustrated in FIGS. 8 to 13, the differential mechanism 6 may be replaced with the differential mechanism 206.

In the aforementioned modification, too, since at least two pumps can be driven by the same electric motor 3, there is a merit that the number of electric motors can be omitted.

Positioning of the differential mechanisms 6, 206 is not limited to the positioning illustrated in the aforementioned first and second embodiments and their modifications. One of the differential mechanisms 6, 206 may be interposed between the electric motor 3 and any arbitrary one pump selected from the engine cooling pump WPE, the power-control unit cooling pump WPP, and the oil pump OP. Thereby, flowrates may be made different among the arbitrary pumps by configuring as above.

In the first and second embodiments and their modifications, one of the differential mechanism 6 and the differential mechanism 206 is provided for the three pumps. However, two or more differential mechanisms in total may be provided by providing the differential mechanism 6 or the differential mechanism 206 between each of the three pumps. As a result, the flowrates of the three pumps may be made adjustable independently.

The advantageous effects of the aforementioned cooling device for vehicle according to the present application may be summarized as follows. The aforementioned cooling device for vehicle according to the present application can use the electric motor in common and can also make driving states of a plurality of pumps different by the differential mechanism. The driving states of the plurality of pumps can be made different by the differential mechanism, while the costs can be reduced by use of the electric motor in common as compared with the case where the electric motors exclusively for each of the pumps are provided separately.

What is claimed is:

1. A cooling device for vehicle comprising:
an electric motor;
an engine cooling pump configured to allow an engine cooling water to flow by rotary power of the electric motor;
a power-control unit cooling pump configured to allow a cooling liquid for power control unit to flow by the rotary power of the electric motor; and
a differential mechanism which makes a flowrate of the engine cooling pump different from a flowrate of the power-control unit cooling pump by controlling transmission of the rotary power from the electric motor.

2. The cooling device for vehicle according to claim 1, further comprising:
an oil pump configured to allow an oil for transaxle to flow by the rotary power of the electric motor.

3. The cooling device for vehicle according to claim 2, wherein
the power-control unit cooling pump, the oil pump, and the engine cooling pump are aligned in this order adjacent to the electric motor;
the power-control unit cooling pump, the oil pump, and the engine cooling pump are connected to a transmission shaft connected to the electric motor;
the differential mechanism is positioned between the oil pump and the engine cooling pump and
the engine cooling pump is configured to be separated from the transmission shaft by turning-off of the differential mechanism.

4. The cooling device for vehicle according to claim 1, wherein
the differential mechanism includes an on/off mechanism which switches transmission of the rotary power between the electric motor and the engine cooling pump between on and off.

5. The cooling device for vehicle according to claim 1, wherein
the differential mechanism includes a transmission assembly interposed between the electric motor and the engine cooling pump.

6. A cooling device for vehicle comprising:
an electric motor;
an engine cooling pump configured to allow an engine cooling water to flow by rotary power of the electric motor;
an oil pump configured to allow an oil for transaxle to flow by the rotary power of the electric motor; and
a differential mechanism which makes a flowrate of the engine cooling pump different from a flowrate of the oil pump by controlling transmission of the rotary power from the electric motor.

7. A cooling device for vehicle comprising:
an electric motor;
a power-control unit cooling pump configured to allow a cooling liquid for power control unit to flow by rotary power of the electric motor;
an oil pump configured to allow an oil for transaxle to flow by the rotary power of the electric motor; and
a differential mechanism which makes a flowrate of the power-control unit cooling pump different from a flowrate of the oil pump by controlling transmission of the rotary power from the electric motor.

* * * * *